Patented Jan. 20, 1942

2,270,634

UNITED STATES PATENT OFFICE 2,270,634

MANUFACTURE OF CONDENSATION PRODUCTS FROM TRIMETHYL-HYDROQUINONE

Otto Isler, Basel, Switzerland, assignor to Hoffman-La Roche Inc., Nutley, N. J., a corporation of New Jersey No Drawing. Application March 10, 1939, Serial No. 261,158. In Switzerland March 18, 1938

1 Claim. (Cl. 260—333)

It has been found that trimethyl-hydroquinone-monoalkylene ethers can be obtained by causing trimethyl-hydroquinone (cumo-hydroquinone) to act on halogeno-alkylenes in the presence of agents capable of combining with acids. These trimethyl-hydroquinone-monoalkylene ethers are rearranged by heating, the transformation products being converted into 2-alkyl-5-oxy-coumaranes or 2-alkyl-6-oxychromanes on treatment with acid condensation agents. In the following formulae, R and R' represent hydrogen or alkyl. If both R and R' represent alkyl groups, then 2-alkyl-6-oxychromanes are formed. If both R and R' represent hydrogen, 2-alkyl-5-oxycoumaranes are obtained.

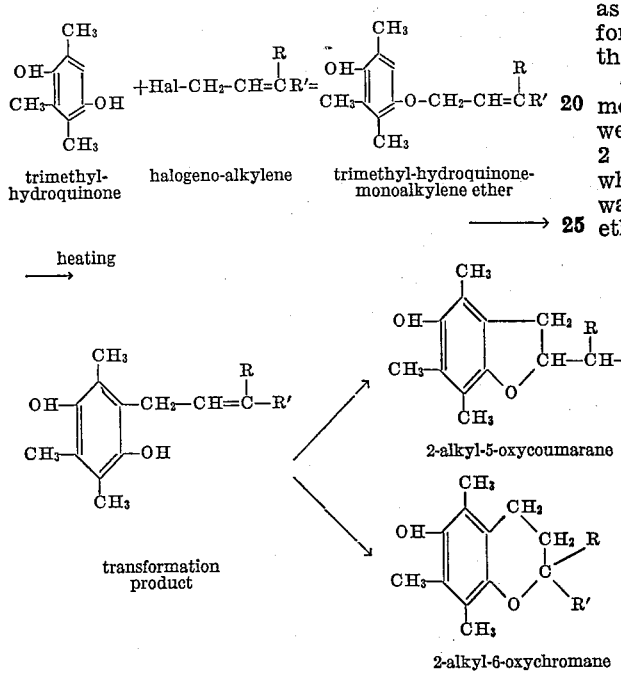

The condensation products from trimethyl-hydroquinone are to be used for the manufacture of medicinal preparations and as medicinal preparations.

Example 1

2.1 parts by weight of phytyl bromide, 1.0 part by weight of trimethyl-hydroquinone and 0.9 part by weight of anhydrous potassium carbonate are heated together for 30 hours with 15 parts by volume of acetone in an atmosphere of nitrogen under reflux. After filtering off from insoluble salts, the residue is washed several times with acetone and the acetone solution concentrated. The residue is taken up in petroleum ether, the trimethyl-hydroquinone, which is difficultly soluble therein, filtered off and the easily soluble phytyl ether adsorbed on an aluminium oxide column. Unetherified phytyl compounds are washed through the column with 1500 parts by volume of petroleum ether. The monoether is now eluted with a mixture of 70 per cent of methyl alcohol and 30 per cent of ether, the solvent evaporated, the residue taken up in petroleum ether and the solution first washed with aqueous methyl-alcoholic potassium hydroxide, then with dilute acid, and finally with water. After evaporation of the petroleum ether the trimethyl-hydroquinone-monophytyl ether remains as a reddish-yellow, slightly viscous oil which forms a sublimate of trimethyl-hydroquinone on thermal decomposition.

4 parts by weight of trimethyl-hydroquinone-monophytyl ether are heated in 10 parts by weight of tetraline under reflux and treated with 2 parts by weight of anhydrous zinc chloride while stirring. The product is allowed to cool, water and petroleum ether added, the petroleum ether layer washed and dried. The condensation products are then fractionated by chromatographic adsorption on an aluminium oxide column. The upper grey zone contains dl-α-tocopherol which can be eluted by a mixture of methyl alcohol and ether. On heating it reduces neutral silver nitrate in methyl-alcoholic solution and, on thermal decomposition, splits off a sublimate of duro-hydroquinone.

Example 2

A solution of trimethyl-hydroquinone in acetone is boiled with allyl bromide under reflux in the presence of anhydrous potassium carbonate. The resulting mono-allyl ether of trimethyl-hydroquinone is heated above 200° C. for some time and then melted with pyridine hydrochloride. The 2,4,6,7-tetramethyl-5-oxycoumarane formed is isolated by distillation with steam and purified by vacuum sublimation. It forms crystals melting at 124–125° C. A methyl-alcoholic solution of silver nitrate is reduced by the coumarane on heating.

I claim:

A process for the preparation of dl-α-tocopherol which comprises heating trimethyl-hydroquinone-monophytyl ether to effect rearrangement, and treating the transformation product with an acid condensing agent.

OTTO ISLER.